(12) United States Patent
Hung et al.

(10) Patent No.: US 6,771,329 B2
(45) Date of Patent: Aug. 3, 2004

(54) LIQUID CRYSTAL DISPLAY WITH HOLDER FOR CLAMPING

(75) Inventors: Chien-Ju Hung, Taoyuan (TW); Der-Jane Liu, Kaohsiung (TW)

(73) Assignee: Hannstar Display Corp., Taipei (TW)

( * ) Notice: Subject to any disclaimer, the term of this patent is extended or adjusted under 35 U.S.C. 154(b) by 74 days.

(21) Appl. No.: 10/155,724

(22) Filed: May 28, 2002

(65) Prior Publication Data

US 2003/0043311 A1 Mar. 6, 2003

(30) Foreign Application Priority Data

Aug. 28, 2001 (TW) ........................................ 90214724 U

(51) Int. Cl.⁷ ........................... G02F 1/1333; G06F 1/16
(52) U.S. Cl. ........................................ 349/58; 361/681
(58) Field of Search ........................... 349/58; 361/681; 248/442, 447

(56) References Cited

U.S. PATENT DOCUMENTS

| | | | | |
|---|---|---|---|---|
| 4,475,705 A | * | 10/1984 | Henneberg et al. | 248/447.2 |
| 5,082,235 A | * | 1/1992 | Crowther et al. | 248/231.41 |
| 5,125,612 A | * | 6/1992 | McNeal | 248/442.2 |
| 5,292,099 A | * | 3/1994 | Isham et al. | 248/442.2 |
| 5,383,642 A | * | 1/1995 | Strassberg | 248/442.2 |
| 5,526,180 A | * | 6/1996 | Rausnitz | 359/609 |
| 5,683,070 A | * | 11/1997 | Seed | 248/442.2 |
| 5,769,374 A | * | 6/1998 | Martin et al. | 248/221.11 |
| 5,881,986 A | * | 3/1999 | Hegarty | 248/442.2 |
| 5,890,603 A | * | 4/1999 | Arguin et al. | 211/45 |
| 6,100,942 A | * | 8/2000 | Hollenbaugh et al. | 348/836 |
| 2001/0035921 A1 | * | 11/2001 | Yamanami | 349/58 |

* cited by examiner

Primary Examiner—Tarifur R. Chowdhury
(74) Attorney, Agent, or Firm—Intellectual Property Solutions, Inc.

(57) ABSTRACT

A liquid crystal display that can clamp a document is provided. The liquid crystal display comprises a display body and a holder. The display body is provided with a receiving portion. The holder is disposed at the display body in a manner such that it moves between a receiving position, located inside the receiving portion, and an use position for clamping the document.

22 Claims, 5 Drawing Sheets

LIQUID CRYSTAL DISPLAY WITH HOLDER FOR CLAMPING

BACKGROUND OF THE INVENTION

1. Field of the Invention

The invention relates to a liquid crystal display; in particular, the invention relates to a liquid crystal display with a holder.

2. Description of the Related Art

Many people around the world use personal computers, both at home and at the office, and accessories which make using them easier, more convenient, and more productive are in demand. Also, many office workers spend a considerable amount of time using small paper notes, messages, memos etc. There is often a tendency for quantities of these notes to be present simultaneously and create desktop clutter.

A problem associated with the computers and the environment in which they are generally operated, is the inability to support documents adjacent the computer screen, either for informational reference while working on the computer, for example reference materials required when developing spreadsheets; or simply for viewing while the document itself is keyed into the computer. This problem is especially pronounced when the computer is used in an environment where space is extremely limited.

In view of space problems, millions of people use liquid crystal displays at their workstations. The present invention takes the flat unused surface on the lateral side of the liquid crystal display and equips it with a device to hold and display the numerous small paper notes and memos that otherwise tend to create clutter on desktop surfaces.

SUMMARY OF THE INVENTION

In order to address the disadvantages of the aforementioned liquid crystal display, the invention provides a liquid crystal display with a holder.

Accordingly, the invention provides a liquid crystal display that can clamp a document. The liquid crystal display comprises a display body and a holder. The display body is provided with a receiving portion. The holder is disposed at the display body in a manner such that it moves between a receiving position, located inside the receiving portion, and an use position for holding the document.

Furthermore, the holder comprises a rod and a holding member. The rod is disposed at the receiving portion in a manner such that it moves between the receiving position and the use position. The holding member, for clamping the document, is disposed on the rod.

In a preferred embodiment, the display body is provided with a first guide hole communicating with the receiving portion. The liquid crystal display further comprises a first elastic member and an engaging member. The first elastic member, disposed inside the first guide hole, is a spring. The engaging member is disposed inside the receiving portion in an elastic manner by abutting the first elastic member so that the engaging member fixes the rod when the rod locates at the receiving position.

In a preferred embodiment, the rod is provided with an engaging hole, and the engaging member is provided with a hook for engaging with the engaging hole.

In a preferred embodiment, the display body is provided with a second guide hole communicating with the receiving portion, and the engaging member is provided with a protrusion moving inside the second guide hole.

In a preferred embodiment, the rod comprises a first piece and a second piece. The holder further comprises a rotating member and a second elastic member. The rotating member, for combining the first piece and the second piece, is disposed inside the receiving portion. The second elastic member, for moving the rod to the use position, is disposed on the rotating member.

Furthermore, the rod is provided with a first receiving hole, and the display body is provided with a second receiving hole so that the second elastic member moves inside the first receiving hole and the second receiving hole. The display body is provided with a third guide hole and a fourth guide hole for disposing the rotating member therein. The second elastic member is a spring.

In a preferred embodiment, the rod is provided with a third receiving hole for the holding member to move therein. The rod is provided with a fourth receiving hole communicating with the third receiving hole. The holder further comprises a third elastic member that is used for moving the holding member and disposed inside the fourth receiving hole. The third elastic member is a spring.

In a preferred embodiment, the holding member is provided with a groove for guiding the document.

BRIEF DESCRIPTION OF THE DRAWINGS

The invention is hereinafter described in detail with reference to the accompanying drawings in which:

FIG. 1b is a partial exploded view depicting the liquid crystal display as shown in FIG. 1a;

DETAILED DESCRIPTION OF THE INVENTION

Figure 1A:
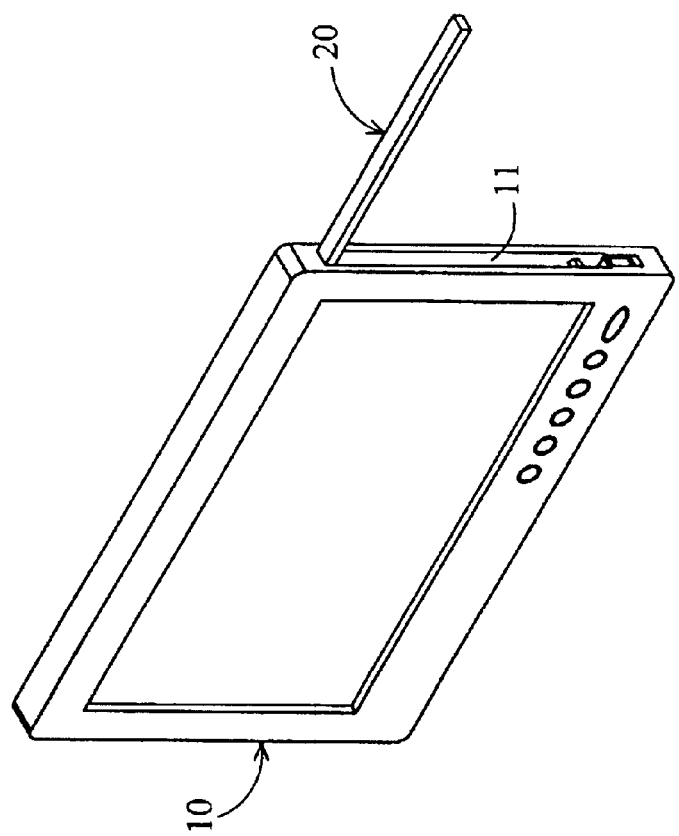
FIG. 1a is a schematic view depicting a liquid crystal display as disclosed in this invention.
Figure 1B:
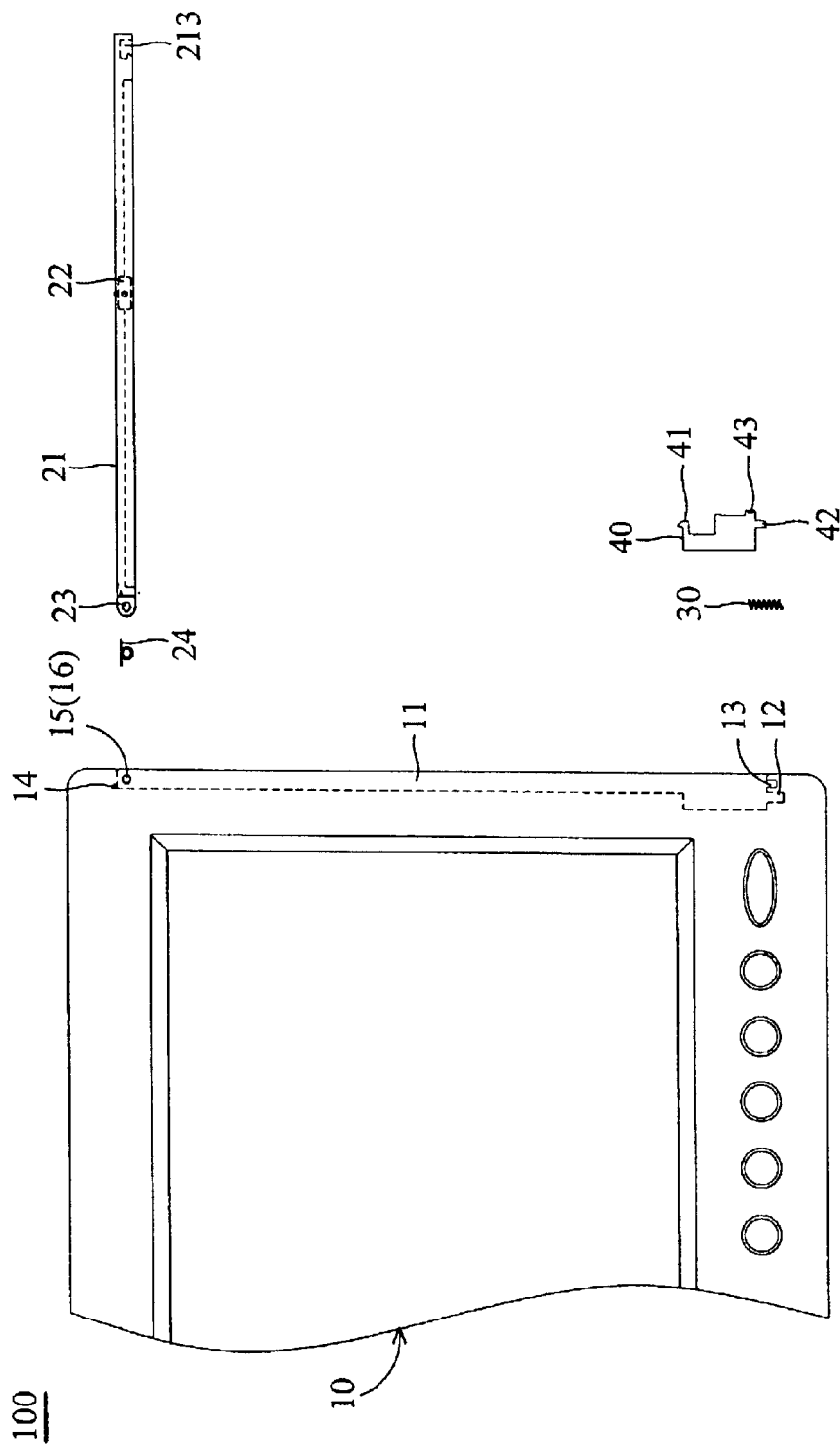

As shown in FIG. 1a, FIG. 1b, FIG. 1c, FIG. 2a, FIG. 2b, FIG. 3a and FIG. 3b, a liquid crystal display 100, as disclosed in this invention, clamps a document (not shown). The liquid crystal display 100 comprises a display body 10 and a holder 20. Referring to FIG. 1a, the display body 10 is similar to the conventional liquid crystal display, and the difference between them is that the display body 10 of this invention is provided with a receiving portion 11 for receiving the holder 20. The display body 10 is provided with a first guide hole 12 and a second guide hole 13 that communicates with the bottom side of the receiving portion 11 respectively. Also, the display body 10 is provided with a second receiving hole 14, a third guide hole 15 and a fourth guide hole 16 that communicates with the top side of the receiving portion 11 respectively.

Figure 1C:
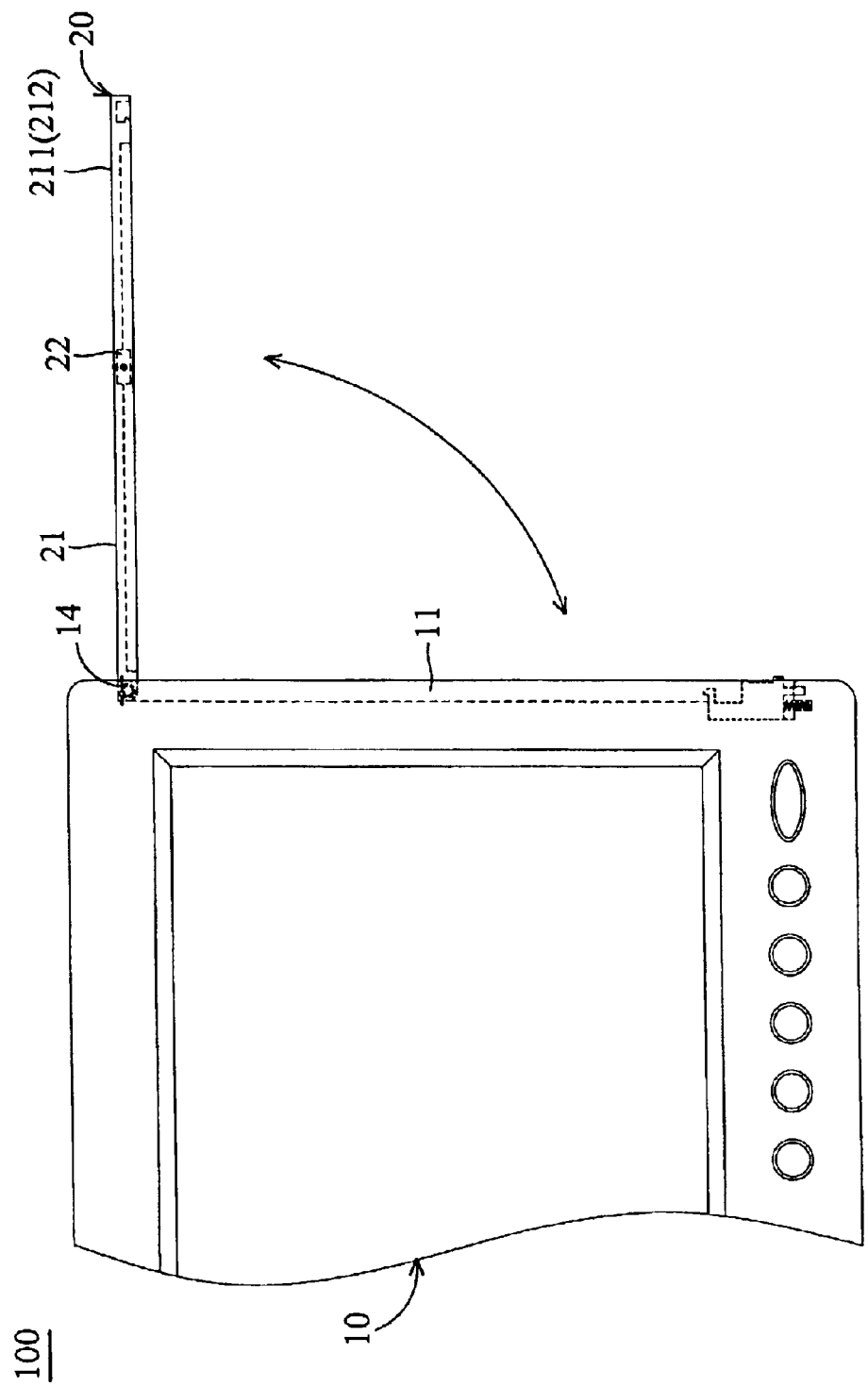
FIG. 1c is a front view depicting the liquid crystal display as shown in FIG. 1a, wherein a holder is separated from a display body.
Figure 2A:
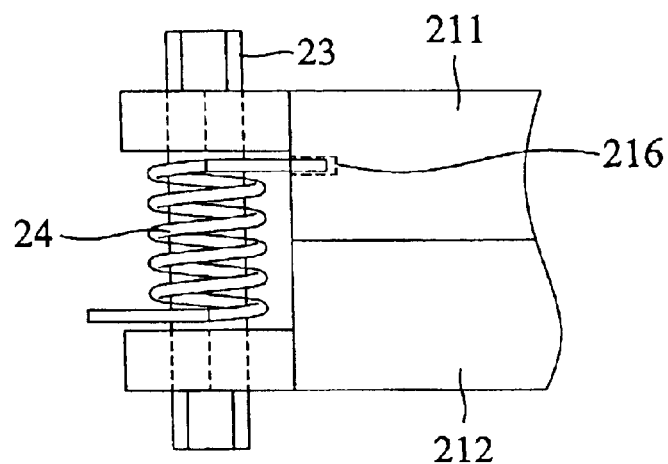
FIG. 2a is a partial enlarged view depicting the holder as shown in FIG. 1c.
Figure 2B:
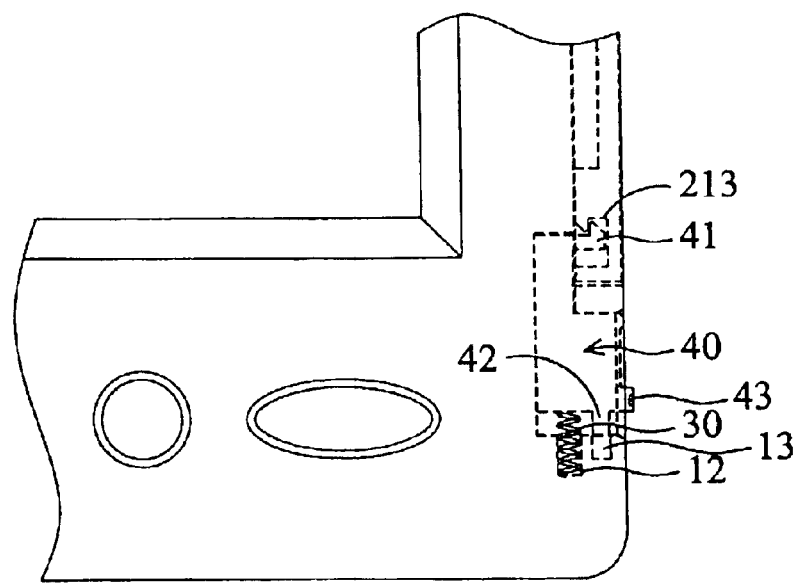
FIG. 2b is a partial enlarged view depicting the liquid crystal display as shown in FIG. 1a, wherein the holder is combined with the display body.
Figure 3A:
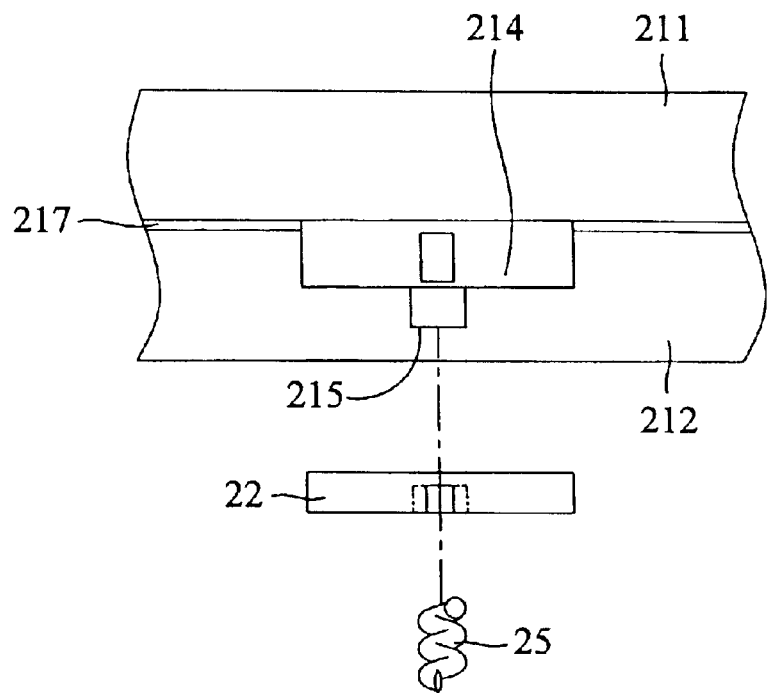
FIG. 3a is a partial exploded view depicting the holder as shown in FIG. 1c.
Figure 3B:
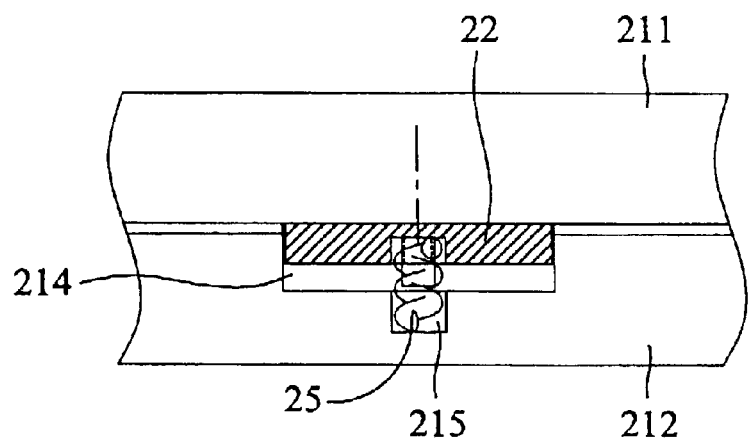
FIG. 3b is another partial enlarged view depicting the holder as shown in FIG. 1c.

The holder 20 is disposed at the display body 10 in a manner such that it can move between a receiving position, located inside the receiving portion 11, as shown in FIG. 2b, and a use position for clamping the document, as shown in FIG. 1c. The holder 20 comprises a rod 21, a holding member 22, a rotating member 23, a second elastic member 24 and a third elastic member 25, as shown in FIG. 3a.

The rod 21 is disposed at receiving portion 11 in a manner such that it moves between the receiving position and the use position. The rod 21 consists of a first piece 211 and a second piece 212. Also, the rod 21 is provided with an engaging hole 213, a third receiving hole 214, a fourth receiving hole 215, a first receiving hole 216 and a groove 217. Referring to FIG. 3a, the third receiving hole 214 is used for the holding member 22 to move therein. The fourth receiving hole 215, communicating with the third receiving hole 214, is used for the third elastic member 25 to move therein. The groove 217 guides the document into the bottom portion of the holder 20. Referring to FIG. 2a, the first receiving hole 216 and the second receiving hole 14 of the display body 10 are used for the second elastic member 24 to move therein.

The holding member 22, for clamping the document, is disposed in the third receiving hole 214 of the rod 21. The rotating member 23, for combining the first piece 211 and the second piece 212, is disposed inside third guide hole 15 and a fourth guide hole 16 that communicates with the receiving portion 11 respectively. Also, the rotating member 23 is used as a pivotal point during the rotation of the rod 21.

The second elastic member 24, for moving the rod 21 to the use position, is disposed at the rotating member 23. The third elastic member 25, moving the holding member 22, is disposed inside the fourth receiving hole 215. Both the second elastic member 24 and the third elastic member 25 may be a spring respectively.

In addition, the liquid crystal display 100 further comprises a first elastic member 30 and an engaging member 40. The first elastic member 30, for moving the engaging member 40, is disposed inside the first guide hole 12, and it may be a spring.

The engaging member 40 is disposed inside the receiving portion 11 in an elastic manner by abutting the first elastic member 30 so that the engaging member 40 fixes the rod 21 when the rod 21 locates at the receiving position. The engaging member 40 is provided with a hook 41, a protrusion 42 and an operation portion 43. The hook 41 is used for engaging with the engaging hole 213 so as to fix the rod 21. The protrusion 42 moves inside the second guide hole 13 in order to move the engaging member 40 in a predetermined path. The operating portion 43 is used for conveniently handling the engaging member 40.

To clamp a document, the engaging member 40 shown in FIG. 2b is moved downward so that the rod 21 separates from the engaging member 40. The rod 21 moves to the use position by the spring force of the second elastic member 24. The holding member 22 is moved so as to clamp the document.

After removing the document from the holder 20, the rod 21 is moved back into the receiving portion 11 and is engaged with the engaging member 40, as shown in FIG. 2b.

As stated above, the liquid crystal display, as disclosed in this invention, is very convenient for the users. Thus, there is no problem when placing the document, and the working efficiency is largely enhanced. In addition, the total weight of the liquid crystal display is not heavier than a conventional liquid crystal display.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A liquid crystal display for clamping a document comprising:

a display body having a receiving portion and a first guide hole communicating with the receiving portion;

a holder disposed at the display body in a manner such that it moves between a receiving position, located inside the receiving portion, and an use position for clamping the document, wherein the holder comprises a rod and a holding member, the rod comprises a first piece and a second piece, the rod is disposed at receiving portion in a manner such that it moves between the receiving position and the use position, the holding member is disposed on the rod for clamping the document;

a first elastic member disposed inside the first guide hole; and an engaging member disposed inside the receiving portion in an elastic manner by abutting the first elastic member so that the engaging member fixes the rod when the rod locates at the receiving position.

2. The liquid crystal display as claimed in claim 1, wherein the first elastic member is a spring.

3. The liquid crystal display as claimed in claim 1, wherein the rod is provided with an engaging hole, and the engaging member is provided with a hook for engaging with the engaging hole.

4. The liquid crystal display as claimed in claim 3, wherein the display body is provided with a second guide hole communicating with the receiving portion, and the engaging member is provided with a protrusion moving inside the second guide hole.

5. The liquid crystal display as claimed in claim 4, wherein the holder further comprises:

a rotating member disposed inside the receiving portion for combining the first piece and the second piece; and a second elastic member disposed on the rotating member for moving the rod to the use position.

6. The liquid crystal display as claimed in claim 5, wherein the rod is provided with a first receiving hole, and the display body is provided with a second receiving hole so that the second elastic member moves inside the first receiving hole and the second receiving hole.

7. The liquid crystal display as claimed in claim 5, wherein the display body is provided with a third guide hole and a fourth guide hole for disposing the rotating member therein.

8. The liquid crystal display as claimed in claim 5, wherein the second elastic member is a spring.

9. The liquid crystal display as claimed in claim 5, wherein the rod is provided with a third receiving hole for the holding member to move therein.

10. The liquid crystal display as claimed in claim 9, wherein the rod is provided with a fourth receiving hole communicating with the third receiving hole.

11. The liquid crystal display as claimed in claim 10, wherein the holder further comprises:

a third elastic member, for moving the holding member, disposed inside the fourth receiving hole.

12. The liquid crystal display as claimed in claim 11, wherein the third elastic member is a spring.

13. The liquid crystal display as claimed in claim 12, wherein the holding member is provided with a groove for guiding the document.

14. A liquid crystal display for clamping a document comprising:

a display body having a receiving portion and a first guide hole communicating with the receiving portion;

a first elastic member disposed inside the first guide hole;

a holder, having a rod and a holding member, disposed at the display body in a manner such that it moves between a receiving position, located inside the receiving portion, and an use position for clamping the document, wherein the rod is disposed at receiving portion in a manner such that it moves between the receiving position and the use position, and the holding member is disposed on the rod for clamping the document; and an engaging member disposed inside the receiving portion in an elastic manner by abutting the first elastic member so that the engaging member fixes the rod when the rod locates at the receiving position.

15. The liquid crystal display as claimed in claim 14, wherein the rod comprises a first piece and a second piece.

16. The liquid crystal display as claimed in claim 14, wherein the rod is provided with an engaging hole, and the engaging member is provided with a hook for engaging with the engaging hole.

17. The liquid crystal display as claimed in claim 16, wherein the display body is provided with a second guide hole communicating with the receiving portion, and the engaging member is provided with a protrusion moving inside the second guide hole.

18. The liquid crystal display as claimed in claim 17, wherein the rod is provided with a first receiving hole, and the display body is provided with a second receiving hole, and the holder further comprises:

a rotating member disposed inside the receiving portion for combining the first piece and the second piece; and a second elastic member disposed on the rotating member in a manner such that the second elastic member moves inside the first receiving hole and the second receiving hole so as to move the rod to the use position.

19. The liquid crystal display as claimed in claim 18, wherein the display body is provided with a third guide hole and a fourth guide hole for disposing the rotating member therein.

20. The liquid crystal display as claimed in claim 18, wherein the rod is provided with a third receiving hole, for the holding member to move therein, and a fourth receiving hole communicating with the third receiving hole.

21. The liquid crystal display as claimed in claim 20, wherein the holder further comprises:

a third elastic member, for moving the holding member, disposed inside the fourth receiving hole.

22. The liquid crystal display as claimed in claim 21, wherein the holding member is provided with a groove for guiding the document.

* * * * *